United States Patent
Gopalakrishnan

(10) Patent No.: US 8,694,422 B1
(45) Date of Patent: Apr. 8, 2014

(54) METHOD AND SYSTEM FOR USER SIGNUP BY A NETWORK SERVICE PROVIDER

(71) Applicant: Ebay Inc., San Jose, CA (US)

(72) Inventor: Subha Gopalakrishnan, Fremont, CA (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 14/059,841

(22) Filed: Oct. 22, 2013

Related U.S. Application Data

(63) Continuation of application No. 13/717,665, filed on Dec. 17, 2012.

(51) Int. Cl.
*G06Q 40/00* (2012.01)
(52) U.S. Cl.
USPC .............................................. 705/38; 705/39
(58) Field of Classification Search
USPC ..................................................... 705/35–40
See application file for complete search history.

(56) References Cited

U.S. PATENT DOCUMENTS

| 8,523,069 B2 * | 9/2013 | Hammad et al. ............... 235/384 |
| 2008/0208681 A1 | 8/2008 | Hammad et al. |

* cited by examiner

*Primary Examiner* — Thu Thao Havan
(74) *Attorney, Agent, or Firm* — Haynes and Boone, LLP

(57) ABSTRACT

A system and a method for performing purchase transactions over a network are provided. The system includes a server controlled by a service provider, including a link to a network; a processor circuit, the processor circuit configured to receive purchase requests from a mobile phone, and to transfer funds from a user account to a vendor account; and a memory circuit storing a plurality of mobile phone numbers and a plurality of personal identification numbers (PINs), wherein each mobile phone number and PIN is associated with a user account. A non-transitory machine-readable medium may include a plurality of machine-readable instructions which when executed by one or more processors of a server controlled by a service provider are adapted to cause the server to perform a method as above.

20 Claims, 4 Drawing Sheets

METHOD AND SYSTEM FOR USER SIGNUP BY A NETWORK SERVICE PROVIDER

REFERENCE TO RELATED APPLICATIONS

This application is a continuation of U.S. patent application Ser. No. 13/717,665, filed on Dec. 17, 2012, which is hereby incorporated by reference in its entirety.

BACKGROUND

1. Field of the Invention

Embodiments disclosed herein relate generally to the field of user signup for a private account service provider over a network. More particularly, embodiments disclosed herein relate to the field of user signup for a private account service provider using a mobile phone.

2. Description of Related Art

Private account service providers over a network have proliferated in the past few years. Typically, signing up to become a user of a private account service provider involves providing detailed personal information from the user to the private account service provider. For example, in a first step the user may be prompted to provide a personal bank account number, and a routing number for that bank account. In a second step, the private account service provider may verify the validity of the information provided by the new user by performing a small deposit in the bank account provided, using the routing number. For example, the service provider deposits a small and variable amount into the bank account, by wire transfer. Once the deposit amount is verified by the user and the private account service provider, a new account may be opened for the user with the private account service provider. The drawback of the above approach is the long time it takes for a bank account to process and post a deposit made by wire transfer. Furthermore, although the wire transfer amounts to a small deposit, it is an up-front capital loss for the private account service provider. Accrued over a large number of new users, it may become a significant burden for the service provider, especially since these funds need to be readily available.

What is needed is a method for providing user signup into a private account service provider that is simple to operate, is highly secure, and reduces up-front expenses for a private account service provider.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

Figure 1:
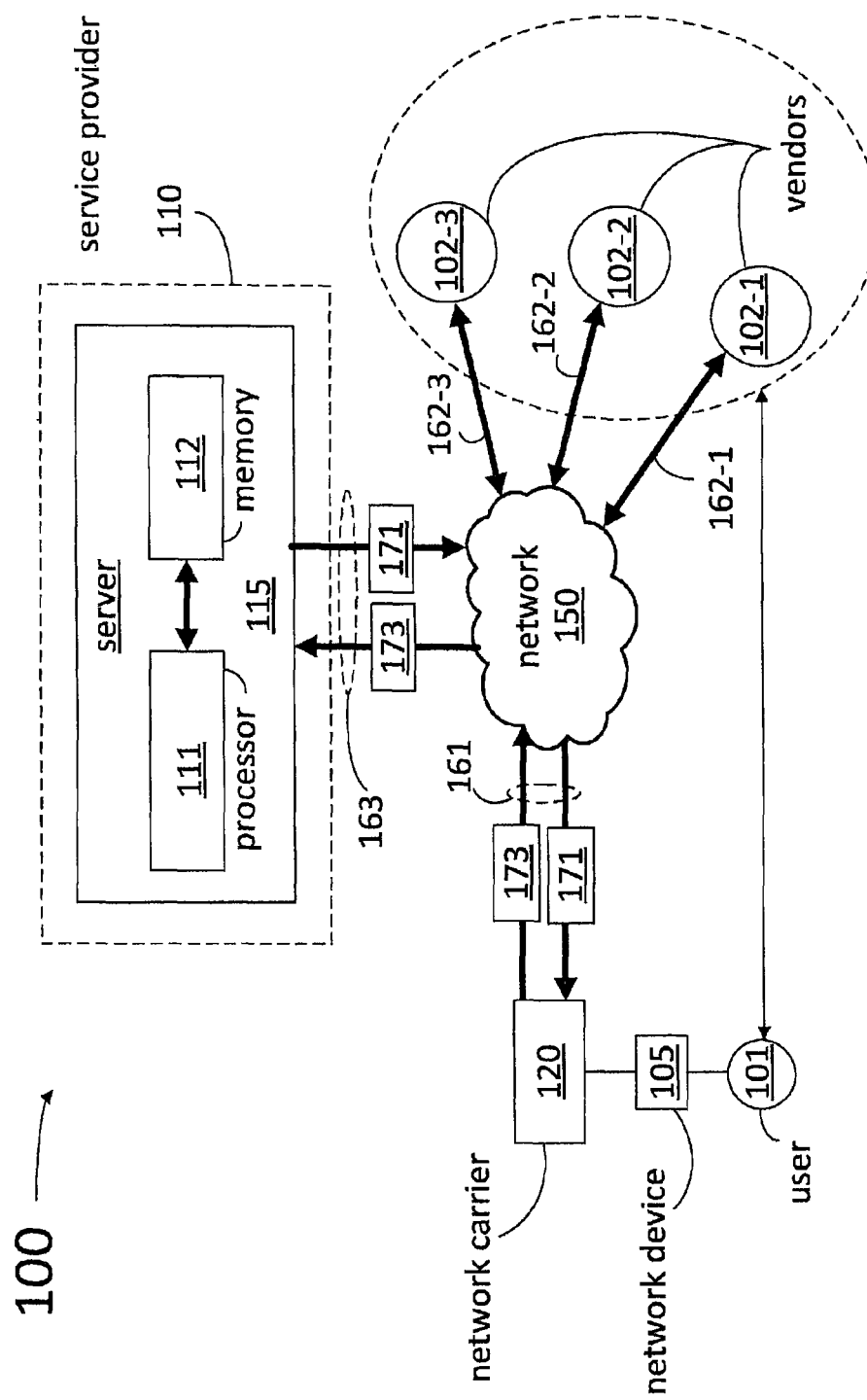
FIG. 1 shows a system for providing commercial transactions through a network service provider, according to some embodiments.

According to embodiments disclosed herein a system for performing purchase transactions over a network may include a server controlled by a service provider, wherein the server includes a link to a network; a processor circuit, wherein the processor circuit is configured to receive purchase requests from a mobile phone via a network carrier; and the processor circuit is configured to transfer funds from a user account to a vendor account when a purchase request is received; and a memory circuit storing a plurality of mobile phone numbers and a plurality of personal identification numbers (PINs), wherein each mobile phone number and PIN is associated with a user account.

According to some embodiments, a non-transitory machine-readable medium may include a plurality of machine-readable instructions which when executed by one or more processors of a server controlled by a service provider are adapted to cause the server to perform a method including: obtaining a user mobile phone number; verifying the user mobile phone number; selecting a user personal identification number (PIN); creating a user account in the service provider; and sending a message to the user confirming the creation of the account.

In some embodiments, a method for performing purchase transactions over a network by a service provider having a processor circuit and a memory circuit may include: receiving a request for a purchase transaction from a user; verifying the user mobile phone number; transferring funds to a vendor account; and placing a charge to an account in a network carrier, the account associated to the user mobile phone number.

As mobile phone usage becomes more prevalent, so does a desire to use the mobile phone as an identification device to access personal information and funds at any point in time, anywhere. In fact, in most commercial environments today, a person is as likely to carry a personal mobile phone as to carry an identification card (ID) such as a driver's license or a credit card. In some circumstances, a person may not carry a wallet, and still carry a cell phone or a mobile phone that is able to access the internet through a network carrier. Accordingly, embodiments disclosed herein take advantage of the availability of mobile phones closely related to users carrying them. In some embodiments, a mobile phone is used as an identification device and a network accessible device to open an account for a new user with a private account service provider.

Accordingly, the user may access the private account service provider through a network carrier that provides service to the mobile phone. The network carrier has personal information for the user, such as billing address, name, and even mobility habits. Thus, the private account service provider may safely rely on the network carrier's authentication of the user via the mobile phone number. Furthermore, in many instances even when the user switches the network carrier servicing its mobile phone, the mobile phone number may remain the same. Thus, the private account service provider may rely on the mobile phone number to authenticate the user's identity through a new network carrier.

Embodiments as disclosed herein are desirable for a private account network provider, as no up-front costs are induced for opening a new user account. Furthermore, reliance on a previous contract relation between the user and a network carrier servicing the mobile phone is a guaranty for the private account service provider of the trustworthiness of the user. Embodiments disclosed herein may be desirable for the user, since access to funds in an account with a service provider may be effective almost immediately. Also, the user may find it convenient to lump the costs of transactions through private account service provider together with the costs of servicing the mobile phone through the network carrier, in a single bill.

A network carrier that specializes in servicing mobile phones may also find embodiments disclosed herein desirable, as an added fee may be included to all transactions involving the private account service provider. Furthermore, offering the ability to host an account for the private account service provider may be a perk to attract new users to a network carrier servicing mobile phones.

FIG. 1 shows a system 100 for providing commercial transactions through a network service provider 110, according to some embodiments. Service provider 110 includes server 115. Server 115 includes processor circuit 111 and memory circuit 112. Server 115 is coupled to a network 150 through a link 163. According to embodiments disclosed herein, network service provider 110 may be a private account service provider handling private funds accounts for registered users and enterprises, such as PayPal, Inc. of San Jose, Calif.

A user 101 carries a mobile phone 105 coupled to network 150 through a network carrier 120 providing a link 161 to network 150. In other embodiments, devices different than a mobile phone may be used, such as a computing tablet or other suitable device capable of wireless communication through network 150. User 101 and service provider 110 interchange data 171 and data 173 through network 150 and network carrier 120. System 100 may also include a plurality of vendors 102-1, 102-2, and 102-3 (collectively referred hereinafter as vendors 102). Each one of vendors 102 is coupled to network 150 through links 162-1, 162-2, and 162-3 (collectively referred hereinafter as links 162). Each one of links 161, 162, and 163 may be part of a network. For example, links 161, 162, and 163 may be included in a cell phone network, a wireless network, an Ethernet network, or any combination of the above. Data 171 may include information received by user 101 from service provider 110. Data 173 may include information provided by user 101 to service provider 110. For example, data 171 may be a request for a password, a PIN code, or some other account identifier. Data 173 may include a mobile phone number and other user personal address, such as name and address, and name of network carrier 120. Data 173 may also include an e-mail address for the user, so that service provider 110 may send messages directly to the user.

According to some embodiments, network carrier 120 may service mobile phone 105 for user 101 in a post-pay configuration. That is, a long term contract may link user 101 to network carrier 120. Thus, some embodiments may link the newly created user account in service provider 110 to the contract between user 101 and network carrier 120. Such a configuration is desirable because the pre-existence of a contract between user 101 and network carrier 120 is a guaranty for service provider 110 that the user is a trustworthy customer.

In some embodiments, mobile phone 105 may be under a pre-paid contract with network provider 120. In such configuration, further verification from service provider 110 of the authenticity of user 101 may be used. For example, service provider 110 may request an e-mail address for user 101 to exchange verification messages. Thus, service provider 110 may send an e-mail message to user 101, requesting a response. Upon receiving a user response, service provider 110 may open an account for user 101 temporarily linked to mobile phone 105. The account thus created may be set to expire as soon as the pre-paid contract for mobile phone 105 terminates. While the account in service provider 110 is active, and prior to expiration, service provider 110 may request user 101 to provide further personal information such as a bank account and a routing number, so that an account may be created for the user with service provider 110.

In some embodiments, service provider 110 may determine that the user has a pre-paid connection. Such a pre-paid connection may be for example an AT&T $100 pre-paid card. Prior to, or at the time of the pre-paid card expiration, service provider 110 may then use verification channels such as performing random deposits in a user's bank account. This approach ensures that user 101 gets an account with service provider 110, preventing any loss of revenue after the contract between user 101 and network carrier 120 expires.

In some embodiments, having a user's mobile phone number may enable service provider 110 to access detailed personal information from the user, through network carrier 120. Thus, data 173 may be provided by network carrier 120 to service provider 110, and may include for example a user account number with network carrier 120. Data 173 may further include the user's billing address, and other user personal information. For example, in some embodiments, data 173 may include a user mobile trajectory for a period of time. Data 171 may be provided to network carrier 120 by service provider 110 in order for network carrier 120 to prepare a bill for user 101. For example, data 171 may include a list of invoices related to purchases by user 101 with vendors 102.

Furthermore, embodiments consistent with the present disclosure enable tracking frequently travelled locations of user 101, and have a record of these locations. The record may be stored in memory 112. Server 110 may use the stored track data of user 101 to detect fraud or user account abuse. For example, server 110 may issue an alert when an attempt to access a user account originates from a not-so-regular location, or a location not recorded on track. In some embodiments, having a mobile number associated to a user account is desirable to enhance account verification. Account verification through a mobile phone account may be used in lieu of, or in addition to using a third party identity and credit verification system (e.g., Lexis Nexis, Targus, or other). Use of third party account verification includes a cost for service provider 110 since calls to the third party are charged. Using account verification through a mobile phone account with network carrier 120 may reduce or eliminate altogether account verification costs.

According to some embodiments, user 101 may interact with vendors 102 directly, to perform a purchase transaction. For example, user 101 may be at a store location, physically proximal to a vendor 102. With mobile phone 105, user 101 is able to complete the purchase transaction on location, using a personal account and a vendor account with service provider 110. In some embodiments, user 101 may interact with vendors 102 through network 150. For example, user 101 may perform a purchase transaction on a vendor webpage in network 150. User 101 may access network 150 through network carrier 120, and any one of vendors 102 may access network 150 through the corresponding link 162.

Vendors 102 may have private or enterprise accounts with service provider 110. Thus, for every commercial transaction between user 101 and vendors 102, service provider 110 may transfer funds from a user account to the respective vendor account, in the amount of the transaction. In some embodiments, a vendor 102 may not have an account with service provider 110. In such cases, a commercial transaction may still take place, and service provider 110 may contact vendor 102 through network 150 in order to provide funds to cover the transaction. For example, service provider 110 may request vendor 102 to provide bank account information and a routing number, in order to transfer the funds for the transaction. Further, in some embodiments, service provider 110 may take the opportunity to offer a vendor 102 opening an account with service provider 110.

In some embodiments, vendor 102 may not have an account with service provider 110. In such configuration, user 101 may associate an account in service provider 110 as one of the funding sources in the transaction with vendor 102. When user 101 makes a transaction with vendor 102, service provider 110 may transfer any remaining dues directly to vendor 102. For example, service provider 110 may request a bank account and a routing number from vendor 102 to make the fund transfer. Service provider 110 may also send a check or money order to an address provide by vendor 102. Accordingly, one of ordinary skill would recognize other options for service provider 110 to transfer funds due to vendor 102 after a transaction with user 101.

Figure 2:
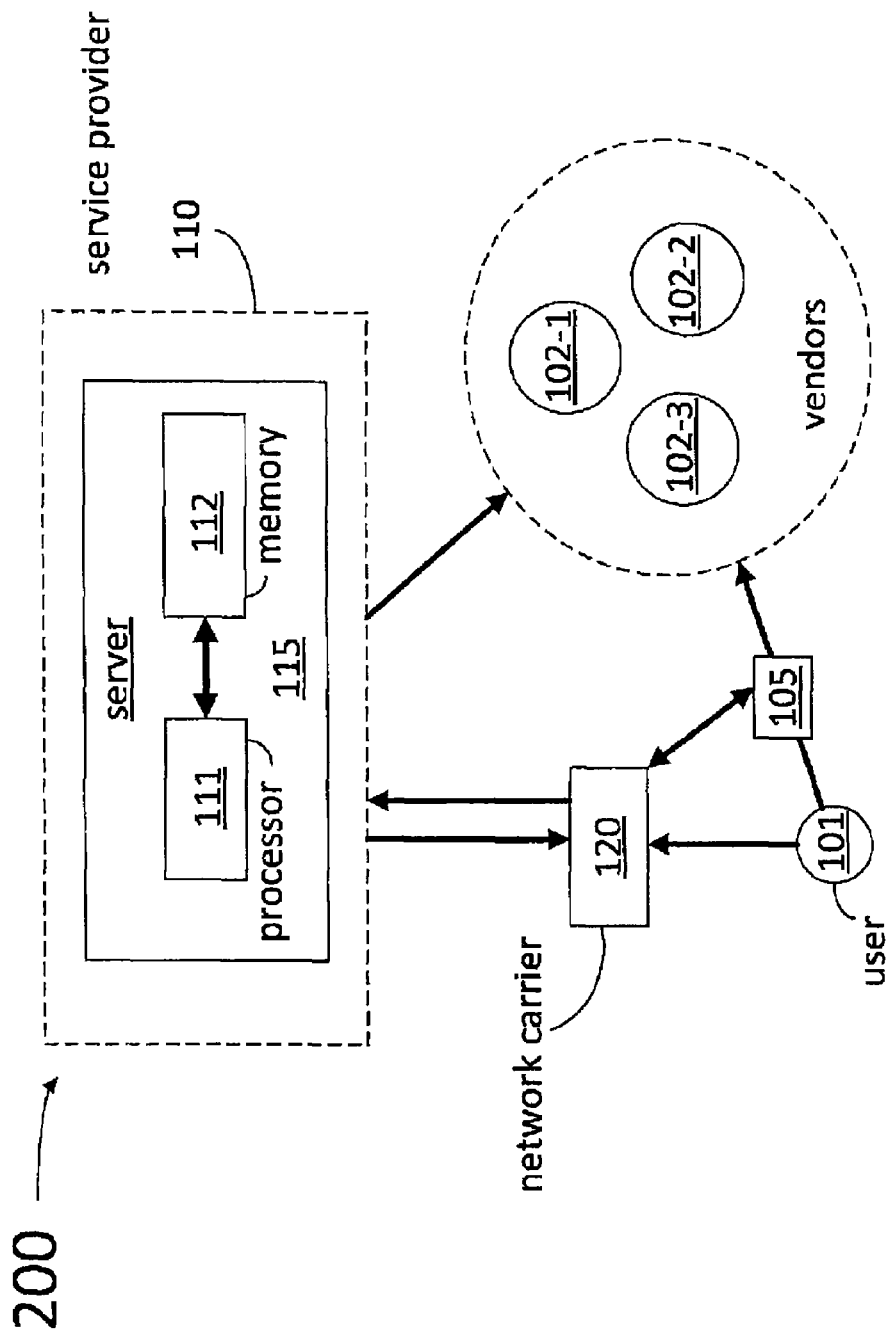
FIG. 2 shows a fund transfer in a system for providing commercial transactions through a network service provider, according to some embodiments.

FIG. 2 shows a fund transfer 200 in system 100 for providing commercial transactions through network service provider 110, according to some embodiments. Accordingly, upon a purchase transaction between user 101 and one of vendors 102, service provider 110 transfers funds to vendor 102 and charges network carrier 120 in a similar amount. Network carrier 120 in turn charges user 101 for the transaction, and pays service provider 110 in the transaction amount. User 101 pays network carrier 120 for the transaction. For example, user 101 pays for the transaction as part of a regularly scheduled payment for the carrier services provided by network carrier 120 to mobile device 105.

Figure 3:
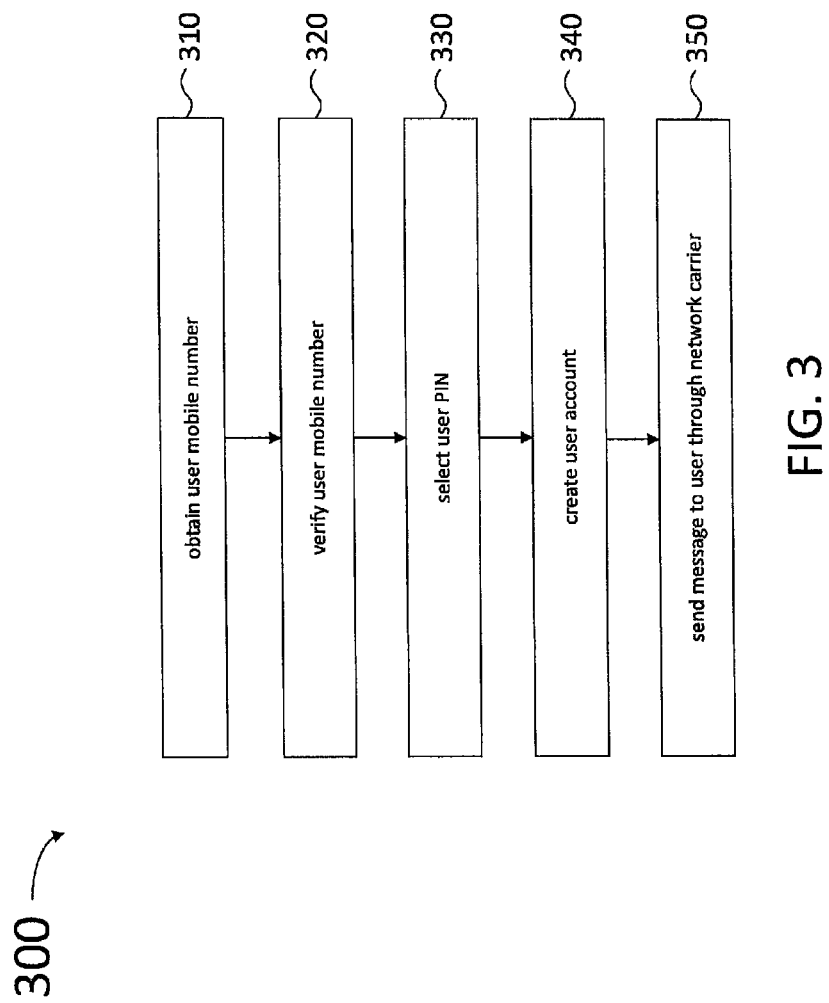
FIG. 3 shows a flow chart for a method to register a user in a network service provider according to some embodiments.

FIG. 3 shows a flow chart for a method 300 to register a user in a network service provider according to some embodiments (e.g., user 101 and service provider 110, FIG. 1). Steps in method 300 may be partially performed by a processor circuit upon executing commands and using data stored in a memory circuit. The processor circuit and the memory circuit may be included in the service provider (e.g., processor circuit 111 and memory circuit 112, FIG. 1). The user may communicate to the service provider in method 300 with a mobile phone coupled to a network through a network carrier (e.g., user 101, network 150, and network carrier 120, FIG. 1). Furthermore, data exchanged between the user and the service provider in method 300 may be exchanged through a network carrier servicing the user's mobile phone (e.g., data 171 and data 173, cf. FIG. 1).

In step 310, the user mobile number is obtained. Step 310 may include obtaining the user mobile number from the network when a user starts an application program in the mobile phone.

In step 320, the user mobile number is verified. Step 320 may include obtaining user account information from a network carrier providing the mobile phone service to the user. Service provider 110 may exchange data with the network carrier through links 161 and 163 to network 150, in step 320. Accordingly, in step 320, the service provider may request information to the network carrier to obtain a user e-mail and a user address. Furthermore, in step 320, the service provider may verify whether the mobile number is associated to a pre-paid account or a post-paid account. In some embodiments, a private account for the user in the service provider may not be created if the mobile number is associated with a pre-paid account. In some embodiments, a temporary private account for the user may be created if the mobile number is associated with a pre-paid account.

In step 330, a personal identification number (PIN) is selected for the user. Step 330 may include requesting the user to input a selected PIN number, and verify the PIN number. In some embodiments, step 330 may include performing an identity check and a credit check for the user. To perform an identity check and a credit check, the service provider may use access to the network. In some embodiments, the service provider may use a third party service to perform user identity check, or credit check, through a link to the network.

In step 340, a user account is created. Step 340 may include storing user's personal information in the memory circuit. Step 340 may include exchange of data between the service provider and the network carrier through the network (e.g., data 171 and 173, cf. FIG. 1). In some embodiments, step 340 may include receiving details of a user's account with the network carrier. Accordingly, when the service provider processes a transaction request from the user, the service provider may associate the user's mobile phone number and PIN to an account in the network carrier. Furthermore, the service provider may associate an e-mail address to the user account.

In some embodiments, step 340 may include notifying the user that an account with the service provider has been created. For example, the service provider may send a message to the user's mobile phone, or may send an e-mail message to the user's e-mail. Further according to some embodiments, service provider may offer the user the possibility to have an account that may be operable independently of the network carrier. For example, the service provider may create an account for the user that may be accessed without a mobile phone. In some embodiments, an independent user account may be separated from the user account linked to the mobile phone. In such configuration, a user may be required to provide bank account information to create the independent account. Moreover, in some embodiments the service provider may charge the user account through the network carrier when the user performs a purchase transaction using the mobile phone. And the service provider may charge the independent account when the user performs the purchase transaction without using the mobile phone.

The service provider may pay the network carrier (e.g., AT&T or Verizon) for the network services in the payment transaction between the user and the vendor. In some embodiments the network carrier may charge the user for this additional cost (e.g., in a monthly bill). In some embodiments, the network carrier may absorb the cost of providing network services through the transaction. Even if the network carrier charges a fee (either to the user or to the service provider), the amount may be less than, or comparable to charges to the service provider for fund transfers from banks or credit card companies. Thus, embodiments consistent with the present disclosure may be beneficial for the user, the service provider, and the network carrier.

Figure 4:
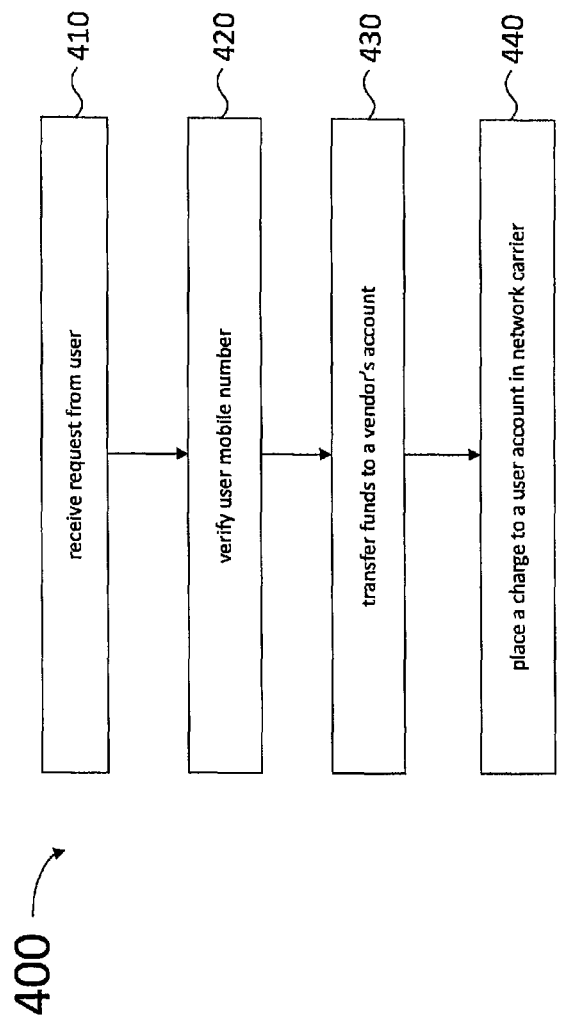
FIG. 4 shows a flow chart for a method to perform commercial transactions through a network service provider according to some embodiments.

FIG. 4 shows a flow chart for a method 400 to perform commercial transactions through a network service provider according to some embodiments. Steps in method 400 may be partially performed by a processor circuit upon executing commands and using data stored in a memory circuit. The processor circuit and the memory circuit may be included in the service provider (e.g., processor circuit 111 and memory circuit 112, FIG. 1).

In step 410, a request from a user is received. In some embodiments, the request is received from a mobile phone that identifies a user account with the service provider (e.g., mobile device 105, user 101, and service provider 110, FIG. 1). For example, the user may be at a store location, finalizing a purchase transaction using a mobile phone. By starting a network application running in the mobile phone, the user may be able to place a request for a payment using the private account with the service provider. The mobile phone may use a network carrier to access a network through a link (e.g., network carrier 120, link 161, and network 150). The service provider may perform step 410 using a link to a network (e.g., link 163 and network 150, FIG. 1).

In step 420, the user mobile number is verified. Step 420 may include comparing the mobile number with a list of mobile numbers registered with the service provider. If the mobile number is in the list of mobile numbers registered with the service provider, step 420 may further request verification from the user, to authenticate the transaction. For example, step 420 may request from the user to input a PIN or a password or passcode, associated with the user account. Thus, even if a user loses a mobile phone, or the mobile phone is stolen, malicious abuse of the payment system may be averted.

In step 430, funds are transferred to a vendor's account when the user's account is verified. For example, a service provider may have an account for a vendor (e.g., vendor 102, FIG. 1), and an account for the user. Thus, the service provider may transfer the funds from the user's account to the vendor's account.

In step 440, a charge is placed to a user account in the network carrier. Step 440 may include receiving from the network carrier the purchase transaction amount. The network carrier may then charge an account for the user's mobile phone in the amount of the purchase transaction, or a similar amount. For example, the network carrier may add a transaction fee to the charges for the user, in addition to the purchase transaction amount.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A system for creating a payment account over a network, the system comprising:
   a server controlled by a service provider, wherein the server comprises a link to a network;
   a processor circuit, wherein the processor circuit is configured to receive a payment account creation request from a mobile phone via a network carrier; and
   a memory circuit coupled to the processor circuit;
   wherein the processor circuit is configured to:
   receive a mobile phone number from the mobile phone;
   communicate the mobile phone number to the wireless carrier;
   receive information about a user associated with the mobile phone number from the wireless carrier;
   store a personal identification number (PIN) associated with the user corresponding to the mobile phone number in the memory circuit; and
   create a payment account for the user based on the mobile phone number.

2. The system of claim 1 wherein the processor circuit is further configured to receive a verification of the mobile phone number for the wireless carrier.

3. The system of claim 1 wherein the received information comprises an email address associated with the user.

4. The system of claim 1 wherein the received information comprises a billing address associated with the user.

5. The system of claim 1 wherein the received information comprises a payment plan type for an account of the user with the wireless carrier.

6. A non-transitory machine-readable medium comprising a plurality of machine-readable instructions which when executed by one or more processors of a server controlled by a service provider are adapted to cause the server to perform a method comprising:
   receiving a mobile phone number;
   communicating the mobile phone number to a wireless carrier;
   receiving information about a user associated with the mobile phone number from the wireless carrier;
   storing a personal identification number (PIN) associated with the user corresponding to the mobile phone number; and
   creating, by a payment provider, a payment account for the user based on the mobile phone number.

7. The non-transitory machine-readable medium of claim 6 wherein the method further comprises verifying the mobile phone number with the wireless carrier before creating the payment account.

8. The non-transitory machine-readable medium of claim 6 wherein the received information comprises an email address associated with the user.

9. The non-transitory machine-readable medium of claim 6 wherein the received information comprises a billing address associated with the user.

10. The non-transitory machine-readable medium of claim 6 wherein the received information comprises a payment plan type for an account of the user with the wireless carrier.

11. The non-transitory machine-readable medium of claim 10 wherein the payment plan type is selected from a group consisting of a pre-paid plan and a post-pay plan.

12. The non-transitory machine-readable medium of claim 6 wherein the received information comprises an account number for an account of the user with the wireless carrier.

13. The non-transitory machine-readable medium of claim 6 wherein the method further comprises performing an identify check on the user based on the received information.

14. The non-transitory machine-readable medium of claim 6 wherein the method further comprises performing a credit check on the user based on the received information.

15. The non-transitory machine-readable medium of claim 6 wherein the method further comprises notifying the user of the creation of the payment account.

16. The non-transitory machine-readable medium of claim 6 wherein the method further comprises:
   completing a purchase transaction using the payment account; and
   charging an account of the user with the wireless carrier for an amount of the purchase transaction.

17. A method for creating a payment account for a user by a service provider having a processor circuit and a memory circuit, the method comprising:
   receiving a mobile phone number;
   communicating the mobile phone number to a wireless carrier;
   receiving information about the user associated with the mobile phone number from the wireless carrier;
   storing a personal identification number (PIN) associated with the user corresponding to the mobile phone number; and
   creating, by a payment provider, the payment account for the user based on the mobile phone number.

18. The method of claim 17, further comprising performing an identity check or a credit check of the user using a third-party service.

19. The method of claim 17, further comprising verifying the mobile phone number with the wireless carrier before creating the payment account.

20. The method of claim 17 wherein creating the payment account comprises creating a temporary payment account when a payment plan type for an account of the user with the wireless carrier is a pre-paid account.

\* \* \* \* \*